(12) United States Patent
Langner

(10) Patent No.: US 12,524,300 B1
(45) Date of Patent: Jan. 13, 2026

(54) DIE-TO-DIE (D2D) INTERFACE WITH CYCLIC REDUNDANCY CHECK (CRC) ERROR CORRECTION CAPABILITY

(71) Applicant: Eliyan Corporation, Santa Clara, CA (US)

(72) Inventor: Paul Langner, Ottawa (CA)

(73) Assignee: Eliyan Corp., Santa Clara, CA (US)

( * ) Notice: Subject to any disclaimer, the term of this patent is extended or adjusted under 35 U.S.C. 154(b) by 26 days.

(21) Appl. No.: 18/765,246

(22) Filed: Jul. 6, 2024

Related U.S. Application Data

(60) Provisional application No. 63/525,314, filed on Jul. 6, 2023.

(51) Int. Cl.
  *G06F 11/10* (2006.01)
(52) U.S. Cl.
  CPC ........ *G06F 11/1004* (2013.01); *G06F 11/102* (2013.01)
(58) Field of Classification Search
  CPC ............... G06F 11/1004; G06F 11/102; G06F 11/1076; G06F 11/08; G06F 11/1443; H04L 1/0045; H04L 1/0061
  See application file for complete search history.

(56) References Cited

U.S. PATENT DOCUMENTS

| 7,694,204 B2 * | 4/2010 | Schmidt ................ H04L 1/0045 714/799 |
| 2022/0334932 A1 * | 10/2022 | Das Sharma ....... G06F 11/1004 |
| 2024/0311330 A1 * | 9/2024 | Das Sharma ....... G06F 13/4295 |

FOREIGN PATENT DOCUMENTS

CN 111725188 A * 9/2020 ......... H01L 23/4824

* cited by examiner

*Primary Examiner* — Shelly A Chase
(74) *Attorney, Agent, or Firm* — Lance Kreisman; Peninsula Patent Group

(57) ABSTRACT

An integrated circuit (IC) chiplet includes a die-to-die (D2D) interface with a cyclic redundancy check (CRC) decoder to process a received data block of N bits that is appended with a transmit-side CRC-16 checksum. The CRC decoder includes checksum circuitry and storage to store N unique non-zero checksum error values. Each of the N unique non-zero checksum error values represents a predicted checksum error value in the event a given bit location in the received data block of N bits is in error. Match circuitry indicates a match of a generated non-zero error checksum value to one of the N unique non-zero checksum error values in the storage. Repair circuitry corrects the given bit location corresponding to the match.

17 Claims, 4 Drawing Sheets

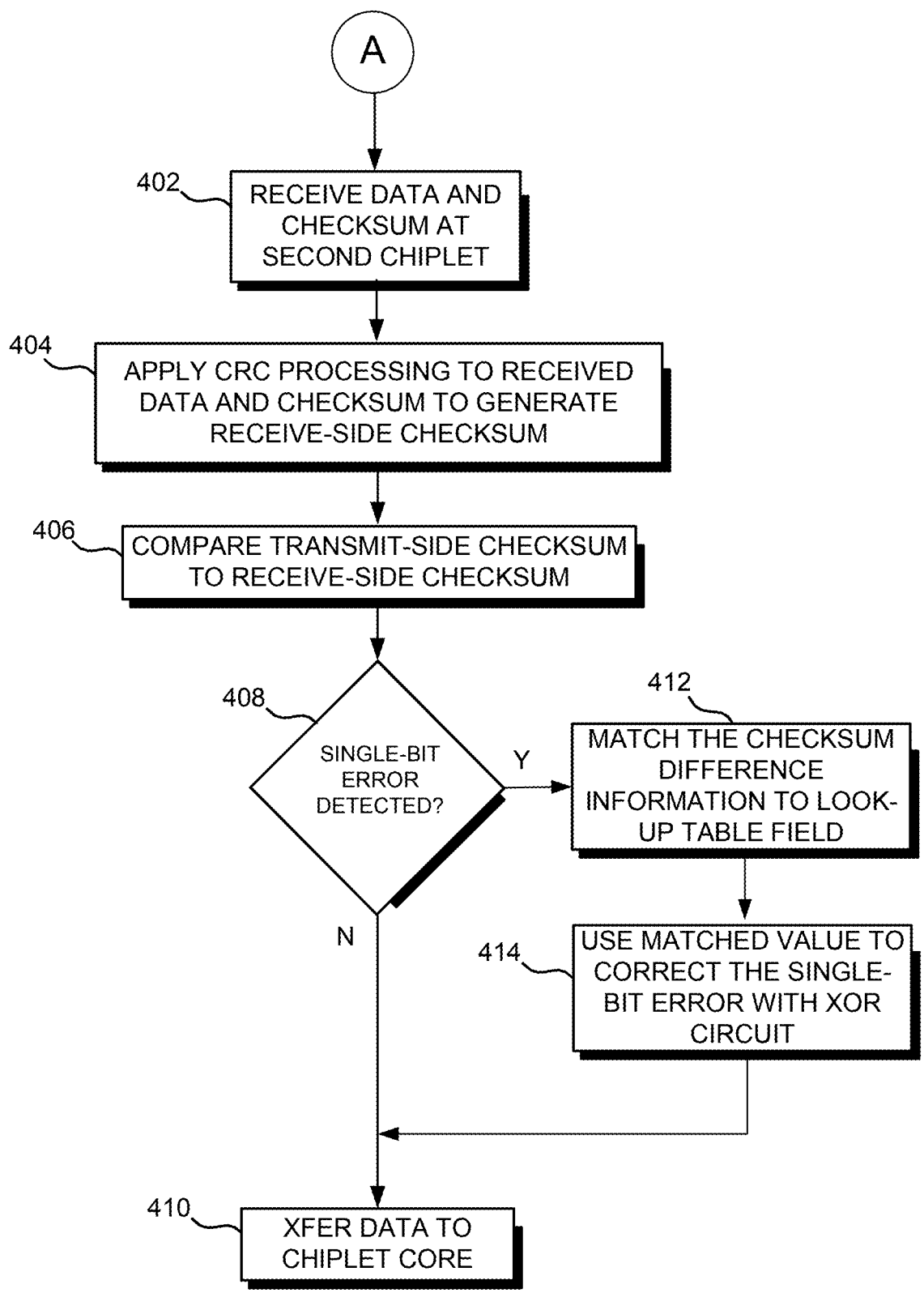

DIE-TO-DIE (D2D) INTERFACE WITH CYCLIC REDUNDANCY CHECK (CRC) ERROR CORRECTION CAPABILITY

CROSS-REFERENCE TO RELATED APPLICATIONS

This application is a Non-Provisional that claims priority to U.S. Provisional Application No. 63/525,314, filed Jul. 6, 2023, entitled ERROR CORRECTION METHOD AND APPARATUS USING UNIVERSAL CHIPLET INTERCONNECT EXPRESS (UCIE) ERROR DETECTION CODE, which is incorporated herein by reference in its entirety.

TECHNICAL FIELD

The disclosure herein relates to semiconductor devices, error detection, error correction, and associated methods.

BACKGROUND

Chiplet architectures have been proposed that favor a modular approach to system in package (SiP) devices. The solution employs smaller sub-processing chips that may be interconnected on a common substrate, each chip containing a well-defined subset of functionality. Chiplets thus allow for dividing a complex design, such as a high-end processor or networking chip, into several small die in a single chip package to achieve significant cost benefits.

Chiplet-based architectures for multi-chip modules (MCMs) generally rely on die-to-die (D2D) interfaces to transfer information between chiplets. One particular D2D interface, known as Universal Chiplet Interconnect express (UCIe), provides error detection capability for data transfers between chiplets. The capability utilizes a cyclic redundancy check (CRC) encoding/decoding technique, specifically CRC-16, to detect bit errors in data blocks. When an error is detected by a receiving chiplet, a response is sent back to a transmit chiplet to retransmit the entire data block.

While beneficial for its intended applications, the current UCIe error detection method potentially impacts chiplet communication bandwidth and performance via the retransmission protocol for error detection events.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 4 illustrates a flowchart of steps for one embodiment of a CRC decoding method for the CRC encoder/decoder circuitry of FIG. 1.

DETAILED DESCRIPTION

Figure 1:
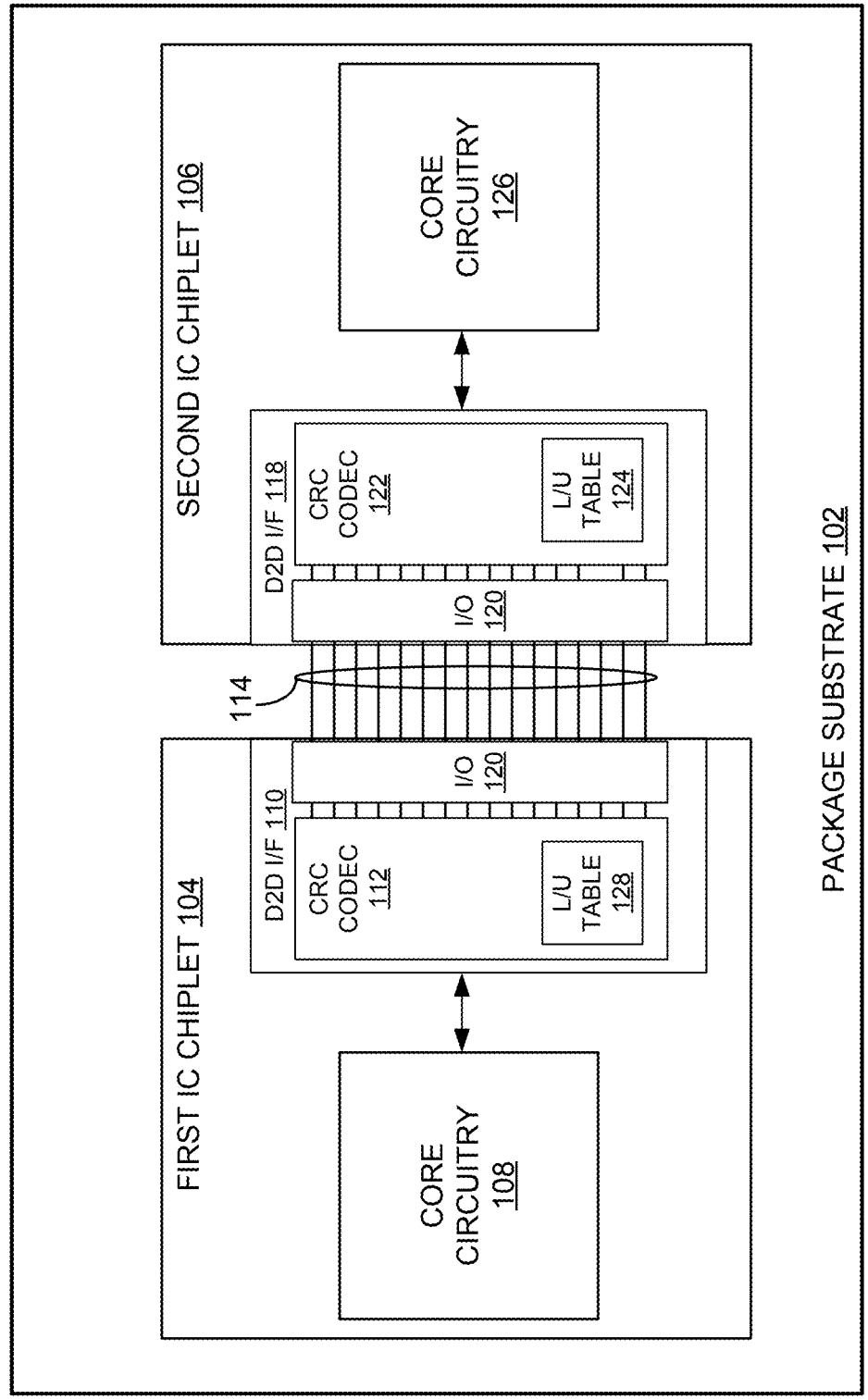
FIG. 1 illustrates a high-level embodiment of a chiplet-based multi-chip module (MCM), including a first integrated circuit (IC) chiplet in communication with a second IC chiplet via a package substrate.

Semiconductor devices, packaging architectures and associated methods are disclosed. In one embodiment, an integrated circuit (IC) chiplet includes a die-to-die (D2D) interface with a cyclic redundancy check (CRC) decoder to process a received data block of N bits that is appended with a transmit-side CRC-16 checksum. The CRC decoder includes checksum circuitry and storage to store N unique non-zero checksum error values. Each of the N unique non-zero checksum error values represents a predicted checksum error value in the event a given bit location in the received data block of N bits is in error. Match circuitry indicates a match of a generated non-zero error checksum value corresponding to one of the N unique non-zero checksum error values in the storage. Repair circuitry corrects the given bit location corresponding to the match. By storing the predefined set of N unique non-zero checksum error values, any given single-bit error in the data block may be corrected by the CRC code, improving overall interface performance by reducing the number of data block retransmissions due to bit errors.

In another embodiment, a chiplet-based multi-chip module (MCM) includes at least one integrated circuit (IC) chiplet with a die-to-die (D2D) interface with a cyclic redundancy check (CRC) decoder to process a received data block of N bits that is appended with a transmit-side CRC-16 checksum. The CRC decoder includes checksum circuitry and storage to store a predefined set of N unique non-zero checksum error values. Each of the N unique non-zero checksum error values represents a predicted checksum error value in the event a given bit location in the received data block of N bits is in error. Match circuitry indicates a match of a generated non-zero error checksum value corresponding to one of the N unique non-zero checksum error values in the storage. Repair circuitry corrects the bit corresponding to the match.

In yet another embodiment, a method of correcting a single-bit error in a bit location of a received data block of N-bits with a cyclic redundancy check (CRC) code is disclosed. The received data block of N-bits is appended with a transmit-side CRC-16 checksum value. The method includes processing the received data block of N bits with the transmit-side CRC-16 checksum to generate a receive-side CRC-16 checksum value. A non-zero error difference value is determined between the transmit-side CRC-16 checksum and the receive-side CRC-16 checksum. The non-zero error difference value is matched to one of N unique non-zero checksum error values to identify a matched error value. The N unique non-zero checksum error values are stored in storage that includes N field locations corresponding to the bit locations of the data block of N bits. The matched error value is stored in a matched field location of the N field locations that corresponds to a bit position of the data block of N bits that reflects a bit error. The bit error is repaired by applying an N-bit repair word comprising a correction bit disposed in a bit location of the N-bit repair word that corresponds to the matched field location and the bit location of the single-bit error of the received data block of N bits.

Throughout the disclosure provided herein, the term chiplet-based multi-chip module (MCM) is used to represent a semiconductor device that incorporates multiple semiconductor chiplet die or sub-packages in a single unitary package. A chiplet-based MCM may also be referred to as a system in a package (SiP).

With reference to FIG. 1, a chiplet-based multi-chip module (MCM) is shown, generally designated 100. For one embodiment, the chiplet-based MCM 100 includes a package substrate 102 that mounts a first integrated circuit (IC) chiplet 104 and a second IC chiplet 106. The first IC chiplet 104 includes first core circuitry 108 that generates data for transmission to the second IC chiplet 106 by a first die-to-die (D2D) interface 110.

Further referring to FIG. 1, for one specific embodiment, the first D2D interface 110 is compliant with the Universal Chiplet Interconnect Express (UCIe) standard. As such, the data to be transferred is organized by the first D2D interface 110 into data block flow-control digits (flits) having block sizes of N bits. For one specific embodiment, the data block size is 1024 bits. The first D2D interface includes a cyclic redundancy check (CRC) coder/decoder (codec) 112 to encode transmit data being sent to the second IC chiplet 106, and to decode receive data that is received from the second IC chiplet 106. The encoded transmit data is then transferred along a die-to-die link 114 by first input/output (I/O) circuitry 116 of the first D2D interface 110.

With continued reference to FIG. 1, the second IC chiplet 106 includes a second D2D interface 118 that generally matches the first D2D interface 110, including second I/O circuitry 120 to receive the transferred data from the first IC chiplet 104. A second CRC codec 122 couples to the second I/O circuitry 120 to decode the CRC-encoded data received from the first IC chiplet 104, and to correct single-bit errors in the data through use of storage, such as a look-up table 124. The corrected data may then be passed to second core circuitry 126 of the second IC chiplet.

For some embodiments, each of the first D2D interface 110 and the second D2D interface 118 provide circuitry that allows each of the IC chiplets 104 and 106 to transmit and receive data to each other in a generally bidirectional manner. Thus, the first D2D interface 110 also employs storage, such as a look-up table 128, for use in correcting single-bit errors in data blocks sent by the second IC chiplet 106 and encoded via a CRC error code.

Generally, CRC error coding involves processing a data block as a binary polynomial, and dividing it by a predefined divisor, often referred to as a generator polynomial. The remainder of the division operation is known as a checksum, which is appended to the data. When CRC-16 is used, the resulting checksum is sixteen bits. The total number of bits associated with the block data is thus 1024+16=1040 bits. When the CRC-encoded data is received, it is decoded by first generating a receive-side checksum, and comparing it to the transmit-side checksum. If the difference is zero, then no errors are present in the data. If the error is non-zero, then at least one bit error is present in the data. In a chiplet context, and following the UCIe standard, if an error is detected, then the entire data block is retransmitted. The UCIe D2D interface standard does not provide data correction capability on-chip, instead utilizing the retransmit protocol when one or more errors are detected.

Figure 2:
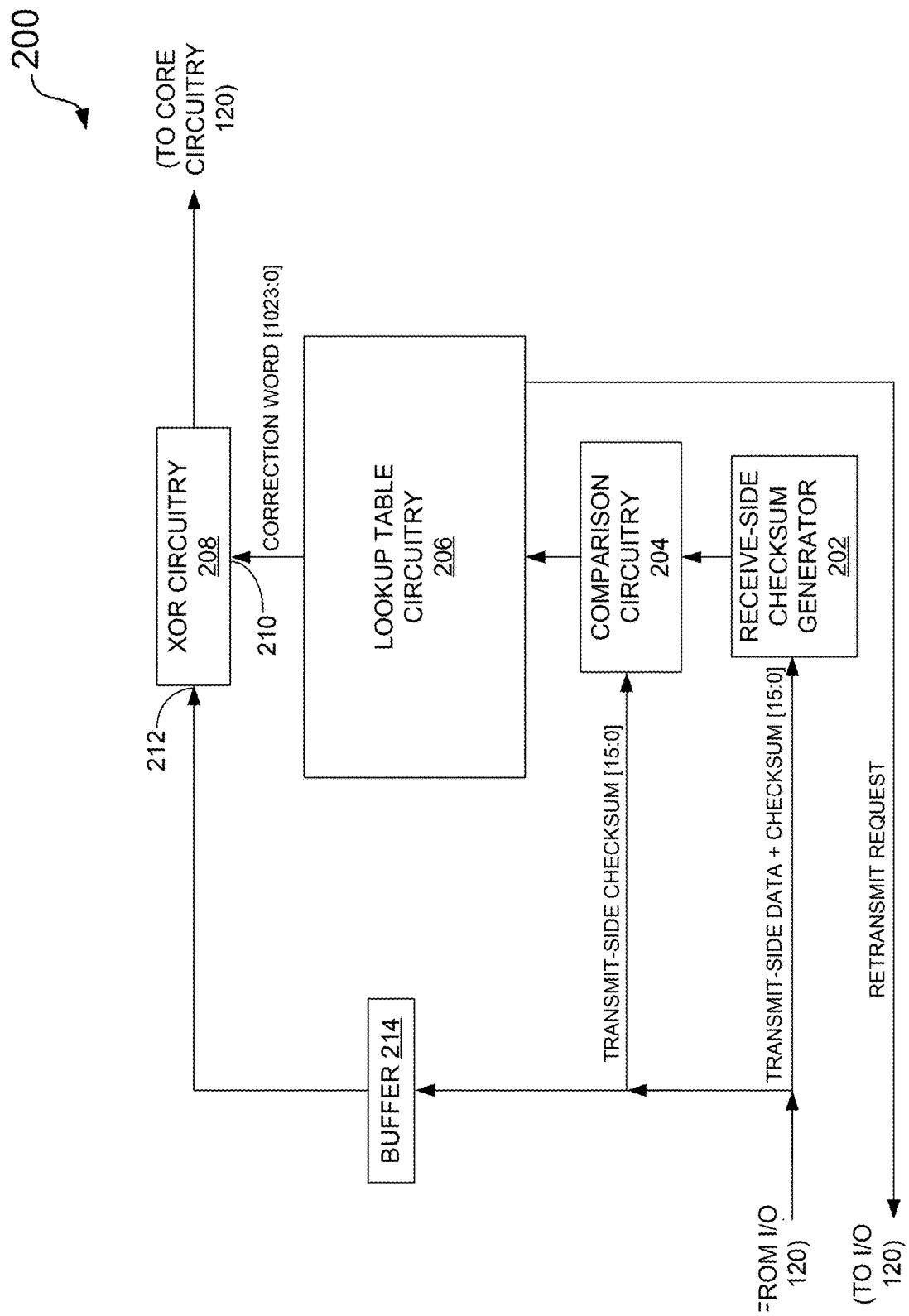
FIG. 2 illustrates one embodiment of the CRC encoder/decoder circuitry of FIG. 1.

In an effort to reduce the number of data block retransmit operations, specified by the UCIe standard when a single-bit error is detected, embodiments of a unique CRC-16 error correction scheme are described. FIG. 2 illustrates further detail for one embodiment of a decoder portion of a receive-side CRC codec circuit 200, that corresponds to the second CRC codec circuit 122 of FIG. 1.

With continued reference to FIG. 2, the decoder portion of the receive-side CRC codec circuit 200 includes a receive-side checksum generator 202 that receives the CRC-encoded transmit data block and its appended transmit-side CRC-16 checksum. The receive-side checksum generator 202 produces a receive-side checksum which is passed to comparison circuitry 204. The comparison circuitry receives both the transmit-side checksum and the receive-side checksum, and determines if there's any difference between the two values, resulting in an error difference value. The determination is then passed to storage 206 that includes at least N entries or fields (corresponding to the block data size) to store non-zero checksum error values. For one embodiment, each of the non-zero checksum error values represent a predicted checksum error value in the event a given bit location in the received data block of N bits forms a single-bit error in the received data block of N bits.

Further referring to FIG. 2, for one specific embodiment, the storage 206 takes the form of a look-up table with a row of 1040 storage entries, or fields, with each field corresponding to a specific bit position of the N-bit data block (1024 bits) and the appended checksum sequence of sixteen bits. Each field stores a predetermined error difference value corresponding to a single-bit error of a given bit in a given bit position of the received N-bit data block. For example, the predetermined error difference value that would result from a single-bit error in bit position 5 (where the first position is bit 0) is stored in the corresponding sixth storage location of the look-up table. Each of the 1040 bit locations exhibit unique checksum values should their corresponding bit be in error, which are reflected as a corresponding unique error difference value.

For one embodiment, once the match is made in the look-up table 206, it outputs a 1024-bit correction mask, or word, for the data block, that includes all zero's except for the bit location corresponding to the lookup table match. The resulting N-bit correction word is fed to one input of an exclusive-or (XOR) circuit 208, at 210. A second input of the XOR circuit 208, at 212, receives the received 1024-bit data block from a buffer 214. The resulting XOR operation maintains the states of the 1024 bits, except for the sole non-zero bit location in the 1024-bit correction word. The error bit is flipped, thus repairing the single bit error.

While the look-up table circuitry discussed above is described in the context of a single 1040-entry table that produces a 1024-bit correction mask, other embodiments may employ variations of the look-up table while still achieving the resulting error correction benefits described herein. For example, one alternative embodiment breaks the table up into smaller accessible sub-tables, all fed with the same checksum value, with each sub-table only responsible for a certain number of bits (such as 128 bits). In this manner, a first sub-table monitors a first set of 128 bits of the data block, while other sub-tables monitor other 128-bit segments of the data block for an error match. Employing a segmented approach to the look-up table circuitry may enhance the timing characteristics associated with the search and match functions.

Figure 3:
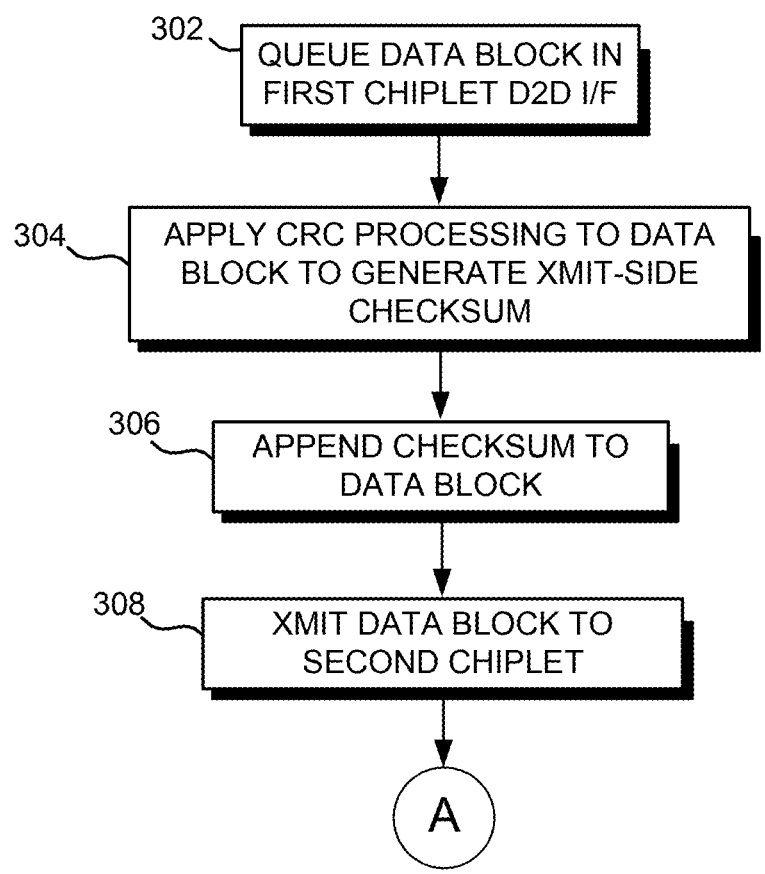
FIG. 3 illustrates a flowchart of steps for one embodiment of a CRC encoding method for the CRC encoder/decoder circuitry of FIG. 1.

FIGS. 3 and 4 illustrate steps employed for one embodiment of a method of operation in a chiplet-based MCM, such as that shown in FIG. 1. FIG. 3 shows steps involved in encoding a data block of N bits with a CRC-16 error code, while FIG. 4 illustrates steps involved in decoding the data block of N bits, including steps to repair a single bit error in the data block through use of the CRC-16 error code.

Referring now to FIG. 3, as transmit data from the first IC chiplet core circuitry 108 is organized into N bit data flow-control digits (flits) (also referred to as data blocks) by the first D2D interface 110, each N bit flit is queued by the D2D interface, at 302. The queued flit is then fed to the first CRC codec 112, which processes the data block as a binary polynomial, and divides it by a predefined divisor, known as a generator polynomial, to generate a transmit-side checksum, at 304. The transmit-side checksum is appended to the data block, at 306, and transmitted with the data block to the second IC chiplet 106, at 308, via the first I/O circuitry 116.

Beginning at the point at which the transmit-side checksum has been generated and appended to the data block, the data bits are subject to errors associated with transmission across the D2D link 114 and during reception through the second I/O circuitry 120. The nature of a chiplet-based MCM, however, generally involves ultra-short links with relatively low noise. With such a relatively low bit error rate (BER) environment, the probability of single-bit errors is significantly higher than multi-bit errors.

The inventor has discovered that a CRC-16 code, employed to protect data blocks on the order of 1024 bits (actually 1040 bits when taking into account the appended checksum), results in a unique difference error value (the difference between the transmit-side checksum and the receive-side checksum) for each single-bit error possibility of the 1040 data block bits. Additionally, no two-bit error combinations in the 1040-bit block mimic the error difference value of a single-bit error. While CRC coding is most often employed merely for error detection, the noted relationships discovered above allow for single-bit error correction through use of storage at the receiver end, that stores the predetermined error difference values for all bits of the data block.

Referring now to FIG. 4, after traversing the D2D link, the transmitted data block and its appended CRC-16 checksum are received at the second D2D interface 118, at 402. The second CRC codec 122 then applies the CRC polynomial processing operations to the data block and the transmit-side checksum to generate a receive-side checksum, at 404. The respective checksums are compared, at 406, to determine whether a non-zero error difference value results. At 408, if the error difference value results in a zero, then no error is detected, and the data block of 1024 bits is transferred to the second IC chiplet core circuitry 126, at 410. In the event that the error difference value is a non-zero value, then the non-zero error difference value is matched with one of the predetermined error difference values stored in the look-up table circuitry 206, at 412. Since the field position of the matched error difference value corresponds to the bit location of the single-bit error (because only that bit location with an error would cause the unique error difference value), a correction word of 1024 bits may be generated, with all zeros except for the single-bit error location. The correction word is then XORed with the received data block of N-bits, with the single-bit error value of the received data block being "flipped", or changed, to correct the error, at 414.

For some embodiments, where multiple errors may be detected that produce error difference values that can't be matched in the look-up table circuitry 206, a retransmission control signal may be sent back to the first IC chiplet 104. Moreover, some embodiments may provide a status signal indicating to the second IC chiplet 106 whether no errors occurred, or whether a single-bit error was corrected, or whether multiple errors were detected and a retransmission signal sent back to the other IC chiplet.

Those skilled in the art will appreciate that the single-bit error correction techniques described above not only extend the utility of CRC coding to error correction (as opposed to merely being used for error detection), but also improve the performance of D2D interfaces such as UCIe by significantly reducing data block retransmissions when errors are detected.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present disclosure. In some instances, the terminology and symbols may imply specific details that are not required to practice the disclosure. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While aspects of the disclosure have been described with reference to specific embodiments thereof, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. An integrated circuit (IC) chiplet, comprising:
a die-to-die (D2D) interface, comprising:
receiver circuitry comprising a cyclic redundancy check (CRC) decoder to process a received data block of N bits that is appended with a transmit-side CRC-16 checksum, the CRC decoder comprising:
checksum circuitry to generate a receive-side CRC-16 checksum value from the received data block of N bits;
storage to store N unique non-zero checksum error values, each of the N unique non-zero checksum error values representing a predicted checksum error value where a given bit location in the received data block of N bits is in error, the N unique non-zero checksum error values stored in respective N field locations corresponding to bit locations of the received data block of N bits;
match circuitry to indicate a match of a generated non-zero error checksum value corresponding to one of the N unique non-zero checksum error values in the storage; and
repair circuitry to apply a bit correction to the given bit location of the received data block of N bits corresponding to the match.

2. The IC chiplet of claim 1, wherein:
the D2D interface is compliant with a Universal Chiplet Interconnect Express (UCIe) interface standard.

3. The IC chiplet of claim 1, wherein:
the received data block of N bits comprises a flit of 1024 bits.

4. The IC chiplet of claim 1, wherein:
the storage is configured as a look-up table.

5. The IC chiplet of claim 4, wherein the look-up table comprises:
an input to receive the generated non-zero error checksum value;
an output with N paths to produce an N-bit correction word, the N paths being coupled to the respective N field locations corresponding to the bit locations of the data block of N bits; and
wherein the match circuitry generates a flag bit on a given one of the N paths of the output that corresponds to one of the N field locations that corresponds to the generated non-zero error checksum value, wherein the flag bit is of a different logic value than bit values routed on other N−1 paths of the output.

6. The IC chiplet of claim 5, wherein:
the repair circuitry comprises an exclusive-or circuit to perform an exclusive-or summation operation with the received data block of N bits and the N-bit correction word.

7. The IC chiplet of claim 1, further comprising:
transmit circuitry comprising a CRC encoder to encode a transmit data block of N bits via a CRC-16 code.

8. A chiplet-based multi-chip module (MCM), comprising:
a first integrated circuit (IC) chiplet comprising a first die-to-die (D2D) interface, the first D2D interface comprising a first cyclic redundancy check (CRC) coder to error code a data block of N bits via a CRC-16 code to generate a transmit data block of the N bits that is appended by a transmit-side CRC-16 checksum;
a second IC chiplet coupled to the first IC chiplet by a D2D link, the second IC chiplet comprising a second die-to-die (D2D) interface, the second die-to-die (D2D) interface comprising:
receiver circuitry comprising a CRC decoder to receive the transmit data block of the N bits and the transmit-side CRC-16 checksum, the CRC decoder comprising:
checksum circuitry to generate a receive-side CRC-16 checksum from the transmit data block of N bits;
storage to store N unique non-zero checksum error values, each of the N unique non-zero checksum error values representing a predicted checksum error value where a given bit location in the transmit data block of the N bits is in error, the N unique non-zero checksum error values stored in respective N field locations corresponding to bit locations of the transmit data block of the N bits;
match circuitry to indicate a match of a generated non-zero error checksum value corresponding to one of the N unique non-zero checksum error values in the storage; and
repair circuitry to apply a bit correction to the given bit location of the transmit data block of the N bits corresponding to the match.

9. The chiplet-based MCM of claim 8, wherein:
the first D2D interface and the second D2D interface are compliant with a Universal Chiplet Interconnect Express (UCIe) interface standard.

10. The chiplet-based MCM of claim 8, wherein:
the transmit data block of N bits comprises a flit of 1024 bits.

11. The chiplet-based MCM of claim 8, wherein:
the storage is configured as a look-up table.

12. The chiplet-based MCM of claim 11, wherein the look-up table comprises:
an input to receive the generated non-zero error checksum value;
an output with N paths to produce an N-bit correction word, the N paths being coupled to the respective N field locations corresponding to the bit locations of the data block of N bits; and
wherein the match circuitry generates a flag bit on a given one of the N paths of the output that corresponds to a field location that corresponds to the generated non-zero error checksum value, wherein the flag bit is of a different logic value than bit values routed on other N−1 paths of the output.

13. The chiplet-based MCM of claim 12, wherein:
the repair circuitry comprises an exclusive-or circuit to perform an exclusive-or summation operation with the transmit data block of the N bits and the N-bit correction word.

14. The chiplet-based MCM of claim 8, wherein the second D2D interface further comprises:
transmit circuitry comprising a second CRC coder to encode a second transmit data block of N bits via the CRC-16 code, the second transmit data block of N bits for transfer to the first IC chiplet.

15. A method of correcting a single-bit error in a bit location of a received data block of N-bits with a cyclic redundancy check (CRC) code, the received data block of N-bits being appended with a transmit-side CRC-16 checksum value, the method comprising:

processing the received data block of N bits with the transmit-side CRC-16 checksum value to generate a receive-side CRC-16 checksum value;

determining a non-zero error difference value between the transmit-side CRC-16 checksum value and the receive-side CRC-16 checksum value;

matching the non-zero error difference value to one of N unique non-zero checksum error values to identify a matched error value, the N unique non-zero checksum error values stored in storage that comprises N field locations corresponding to bit locations of the received data block of N bits, the matched error value stored in a matched field location of the N field locations that corresponds to a bit position of the data block of N bits that is in error; and repairing the single-bit error by applying an N-bit repair word comprising a correction bit disposed in a bit location of the N-bit repair word that corresponds to the matched field location and the bit location of the single-bit error of the received data block of N bits.

16. The method of claim 15, wherein:

the repairing comprises performing an exclusive-or (XOR) operation with the N-bit repair word and the received data block of N bits.

17. The method of claim 16, wherein the storage comprises a look-up table, and wherein:

the matching comprises comparing the non-zero error difference value to each one of the N unique non-zero checksum error values to identify the matched error value in one of the N field locations of the look-up table.

* * * * *